(12) United States Patent
DeWitt, IV

(10) Patent No.: US 11,029,485 B2
(45) Date of Patent: Jun. 8, 2021

(54) OPTICAL MOUNT

(71) Applicant: JAID Technologies Inc., Lima, NY (US)

(72) Inventor: Frank DeWitt, IV, Lima, NY (US)

(73) Assignee: JAID Technologies, Inc., Lima, NY (US)

( * ) Notice: Subject to any disclaimer, the term of this patent is extended or adjusted under 35 U.S.C. 154(b) by 183 days.

(21) Appl. No.: 16/511,059

(22) Filed: Jul. 15, 2019

(65) Prior Publication Data
US 2020/0026029 A1    Jan. 23, 2020

Related U.S. Application Data

(60) Provisional application No. 62/700,017, filed on Jul. 18, 2018.

(51) Int. Cl.
*G02B 7/198* (2021.01)

(52) U.S. Cl.
CPC .................................. *G02B 7/198* (2013.01)

(58) Field of Classification Search
CPC ..................................................... G02B 7/198
USPC ................................................. 359/822, 872
See application file for complete search history.

(56) References Cited

U.S. PATENT DOCUMENTS

| 1,071,725 | A | * | 9/1913 | Franks | F21V 17/02 |
|---|---|---|---|---|---|
| | | | | | 362/282 |
| 1,537,039 | A | * | 5/1925 | Short | B60R 1/04 |
| | | | | | 248/483 |
| 3,357,268 | A | | 12/1967 | Richter | |
| 3,434,688 | A | * | 3/1969 | Engelmann | B60R 1/06 |
| | | | | | 248/483 |
| 3,512,746 | A | * | 5/1970 | Vitaloni | B60R 1/06 |
| | | | | | 248/483 |
| 3,588,025 | A | * | 6/1971 | Gersman | G02B 7/1825 |
| | | | | | 248/451 |
| 4,088,396 | A | | 5/1978 | Edelstein | |
| 4,268,123 | A | * | 5/1981 | Mesco | G02B 7/182 |
| | | | | | 248/488 |
| 4,614,403 | A | * | 9/1986 | Kersten | G02B 7/023 |
| | | | | | 359/818 |
| 4,693,571 | A | * | 9/1987 | Kimura | G02B 7/1827 |
| | | | | | 359/874 |
| 4,818,090 | A | * | 4/1989 | Righi | G05B 19/351 |
| | | | | | 359/874 |
| 4,925,286 | A | | 5/1990 | Cutburth | |
| 6,198,580 | B1 | | 3/2001 | Dallakian | |
| 6,614,601 | B2 | | 9/2003 | Dallakian | |
| 6,947,191 | B2 | * | 9/2005 | Chen | G03B 21/28 |
| | | | | | 359/225.1 |
| 7,645,044 | B2 | * | 1/2010 | Lee | B60R 1/072 |
| | | | | | 359/876 |

(Continued)

*Primary Examiner* — Ricky D Shafer
(74) *Attorney, Agent, or Firm* — Louis S. Horvath

(57) ABSTRACT

An optical mount has a component support for an optical component, a clamp member and a frame. The frame has a component support interface that, when positioned against the component support, defines a first spherical curvature for pivoting the component support about a center of curvature. A clamping interface defines a second spherical curvature, concentric with the center of curvature of the component support interface, for pivoting the clamp member. A coupling is configured to urge the clamp member toward the component support against the frame.

18 Claims, 18 Drawing Sheets

(56) References Cited

U.S. PATENT DOCUMENTS 8,016,438 B2  9/2011  Meyer

* cited by examiner

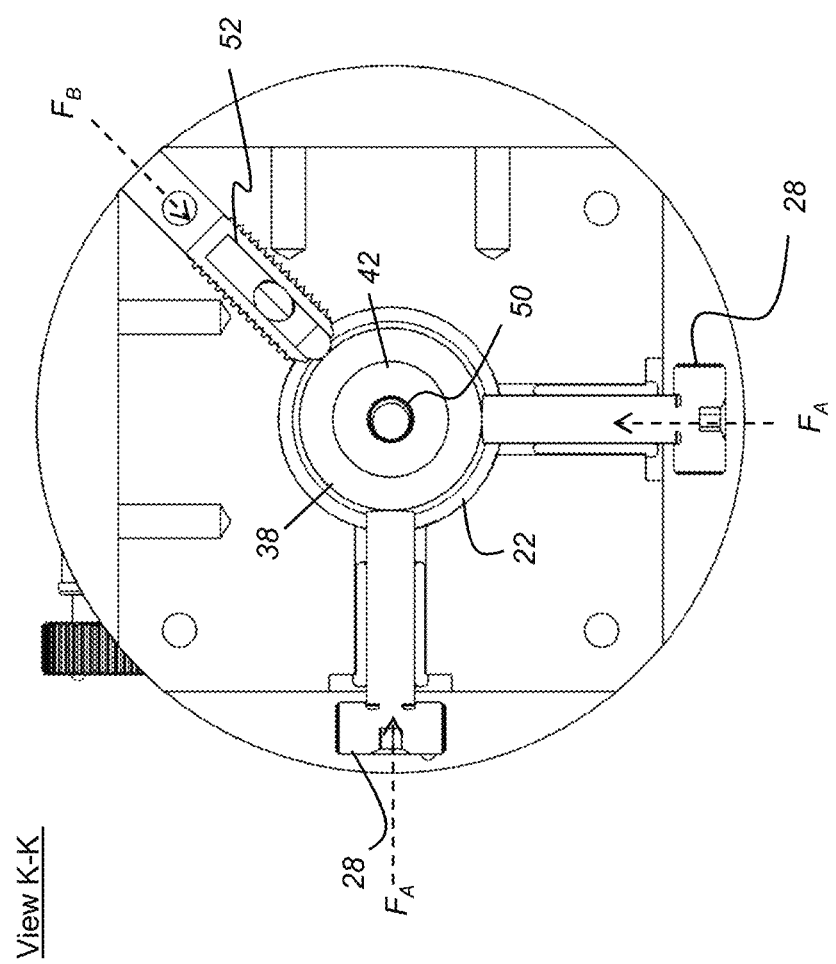

OPTICAL MOUNT

CROSS REFERENCE TO RELATED APPLICATIONS

This application claims the benefit of U.S. Provisional Application Ser. 62/700,017 entitled "Optical Mount" by Frank DeWitt IV, filed 18 Jul. 2018 and incorporated herein in its entirety.

FIELD OF THE INVENTION

The present disclosure relates generally to component mounting apparatus and more particularly relates to apparatus and methods for mounting a lens, mirror, or other component for conditioning or redirection of light or other electromagnetic signal.

BACKGROUND OF THE INVENTION

Component mounts of various types provide support and precision positioning control for mirrors, lenses, and other types of optic elements used in the path of a light beam. Typically designed to be readily configurable, conventional commercial mounts for optics are widely used in lab setups and for alignment and related test functions.

A shortcoming of many types of mounts for optical components relates to their durability and capability to maintain a fixed position once the associated components are properly aligned in place. Conventional mounts provided by manufacturers are often intended for the laboratory environment and for calibration or other test functions, rather than for installation into optical equipment for use in space or in the field. For this reason, optical designers must often design custom mounts to suit the particular needs of an optical system.

Thus, it can be appreciated that there would be advantages to an optical mount that is readily adjustable and can be locked into position for long-term service.

SUMMARY OF THE INVENTION

It is an object of the present disclosure to advance the art of optical mount design. Embodiments of the present disclosure provide an optical mount apparatus that is adjustable and capable of being secured in position once a suitable adjustment is achieved.

According to an aspect of the present disclosure, an optical mount comprises:
a) a component support for an optical component;
b) a clamp member;
c) a frame having:
 (i) a component support interface that, when positioned against the component support, defines a first spherical curvature for pivoting the component support about a center of curvature;
 (ii) a clamping interface that defines a second spherical curvature, concentric with the center of curvature of the component support interface, for pivoting the clamp member;
and
d) a coupling that is configured to urge the clamp member and the component support against the frame.

These objects are given only by way of illustrative example, and such objects may be exemplary of one or more embodiments of the disclosure. Other desirable objectives and advantages inherently achieved by the disclosed disclosure may occur or become apparent to those skilled in the art. The invention is defined by the appended claims.

BRIEF DESCRIPTION OF THE DRAWINGS

The foregoing and other objects, features, and advantages of the disclosure will be apparent from the following more particular description of the embodiments of the disclosure, as illustrated in the accompanying drawings. The elements of the drawings are not necessarily to scale relative to each other.

FIG. 3C shows a cutaway slice of the FIG. 3A mount, showing relative positions of adjustment members and adjustable biasing member for this embodiment.

DETAILED DESCRIPTION OF THE INVENTION

Figure 1A:
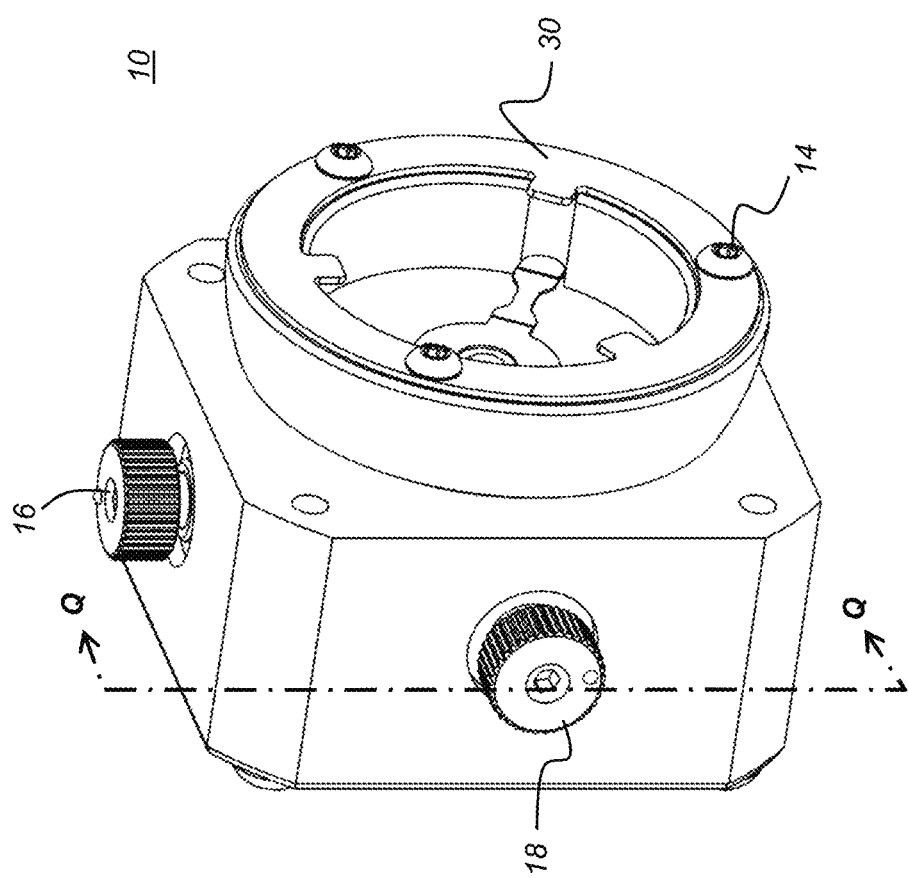
FIG. 1A is a perspective view of an optical mount having a mount holder that can secure a mirror or other optical component with one or more fasteners.

Figures provided herein are given in order to illustrate principles of operation and component relationships according to the present disclosure and are not drawn with intent to show actual size or scale. Some exaggeration may be necessary in order to emphasize basic structural relationships or principles of operation. Some conventional components that would be needed for implementation of the described embodiments, such as support components used for providing power, for packaging, and for mounting, for example, are not shown in the drawings in order to simplify description. In the drawings and text that follow, like components are designated with like reference numerals, and similar descriptions concerning components and arrangement or interaction of components already described may be omitted.

Where they are used, the terms "first", "second", and so on, do not necessarily denote any ordinal or priority relation, but may be used for more clearly distinguishing one element or time interval from another. The term "plurality" means at least two.

In the context of the present disclosure, positional terms such as "top" and "bottom", "upward" and "downward", and similar expressions are used descriptively, to differentiate different surfaces, sides, or views of an assembly or structure and do not describe any necessary orientation of the assembly in an optical or electromechanical apparatus.

In the context of the present disclosure, the term "coupled" is intended to indicate a mechanical association, connection, relation, or linking between two or more components, such that the disposition of one component affects the spatial disposition of a component to which it is coupled. For mechanical coupling, two components need not be in direct contact, but can be linked through one or more intermediary components.

In the context of the present disclosure, a surface considered to "reflect" or to be reflective at a certain wavelength when the beam reflected is the signal usable in a particular implementation. Reflection can be any suitable percentage of useful incident light of that wavelength, even at reflectivity of less than 80 or 90 percent, for example.

In the context of the present disclosure, two elements are considered to be substantially orthogonal if their angular orientations differ from each other by 90 degrees+/−12 degrees. Relative angles outside this range are considered to be oblique.

Embodiments of the present disclosure provide a stable component mount for optical components or other components that are directive of or that condition a signal conveyed by the components, wherein the mount allows straightforward adjustment of component position and enables positionally locking the component in place; embodiments can include the capability to adjust, then fix component position, even subsequently removing adjustment components. This allows the mount to be used in other instrumentation where long-term service and alignment is needed. The mount of the present disclosure can alternately be used to manipulate components or structures that require positioning at tight tolerances.

Referring to FIG. 1A, there is shown a perspective view of an optical mount 10 having a component support 30, a holder that can secure a mirror or other optical component (not shown) and may have one or more fasteners 14. One or more adjustment members 16, 18, shown as thumbscrews, enable fine tuning of component orientation and positioning.

Figure 1B:
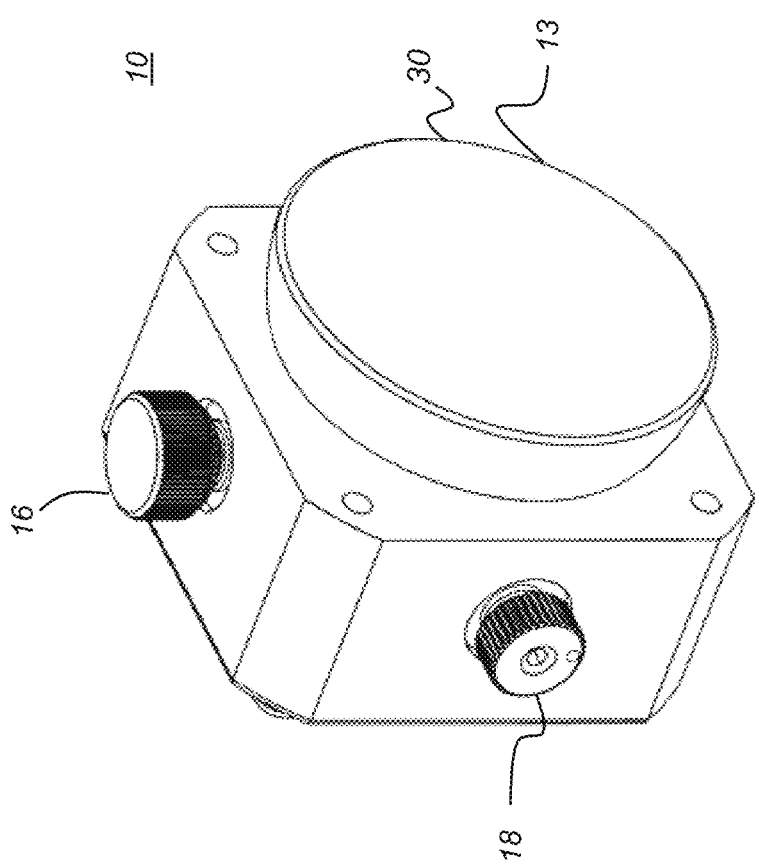
FIG. 1B is a perspective view that shows an alternate embodiment of the present disclosure in which an optical component is integrally formed as part of the component support.

FIG. 1B shows an alternate embodiment of the present disclosure in which an optical component 13 is integrally formed as part of the component support 30. For example, it may be advantageous to condition the surface of the component support 30 itself to form a mirror or other reflector for an optical apparatus.

Figure 2A:
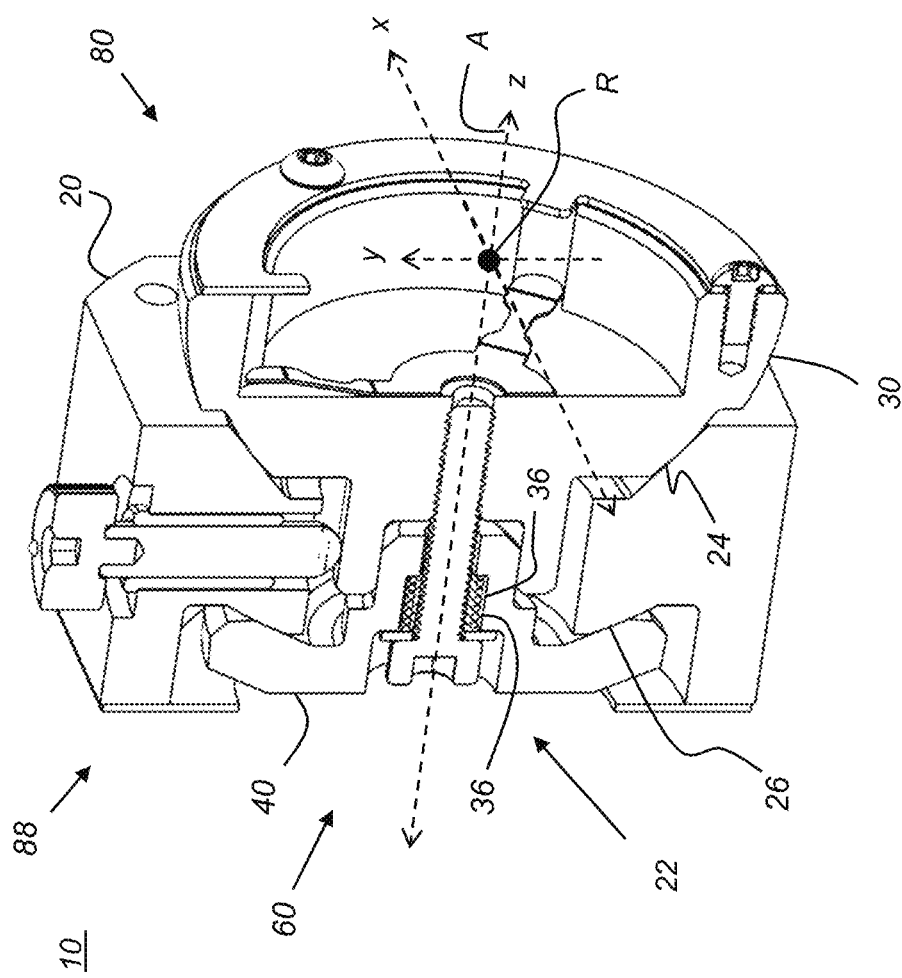
FIG. 2A shows a perspective cross sectional view of the optical mount.
Figure 2B:
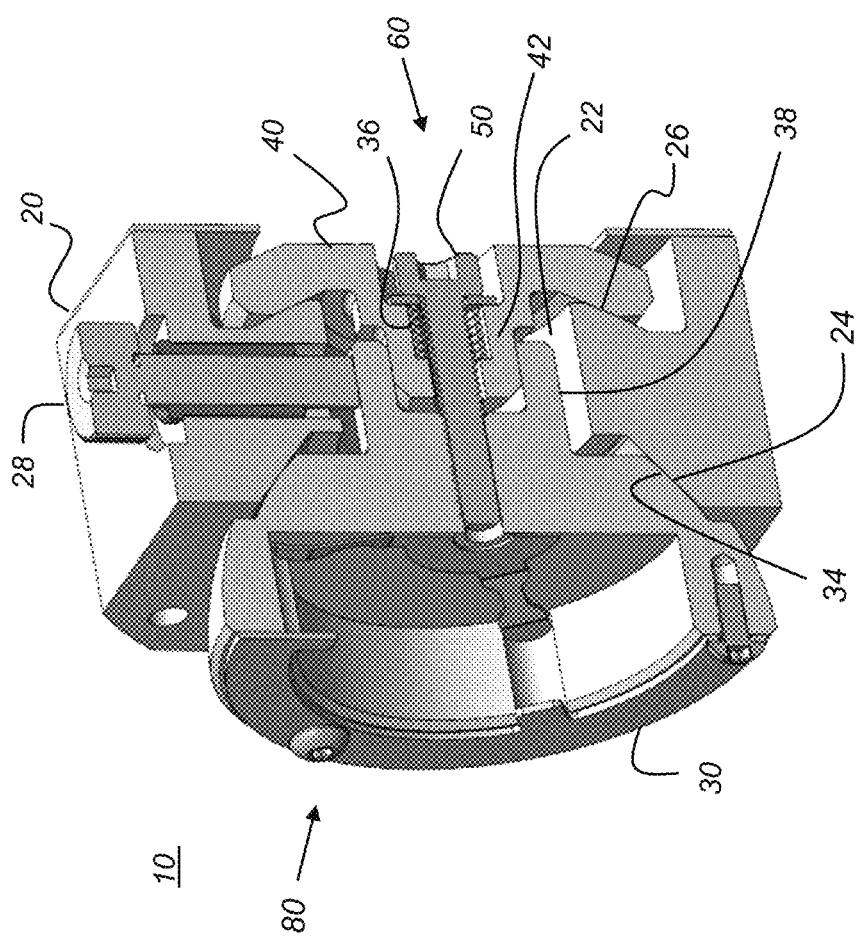
FIG. 2B shows a perspective cross sectional view of the optical mount.
Figure 2C:
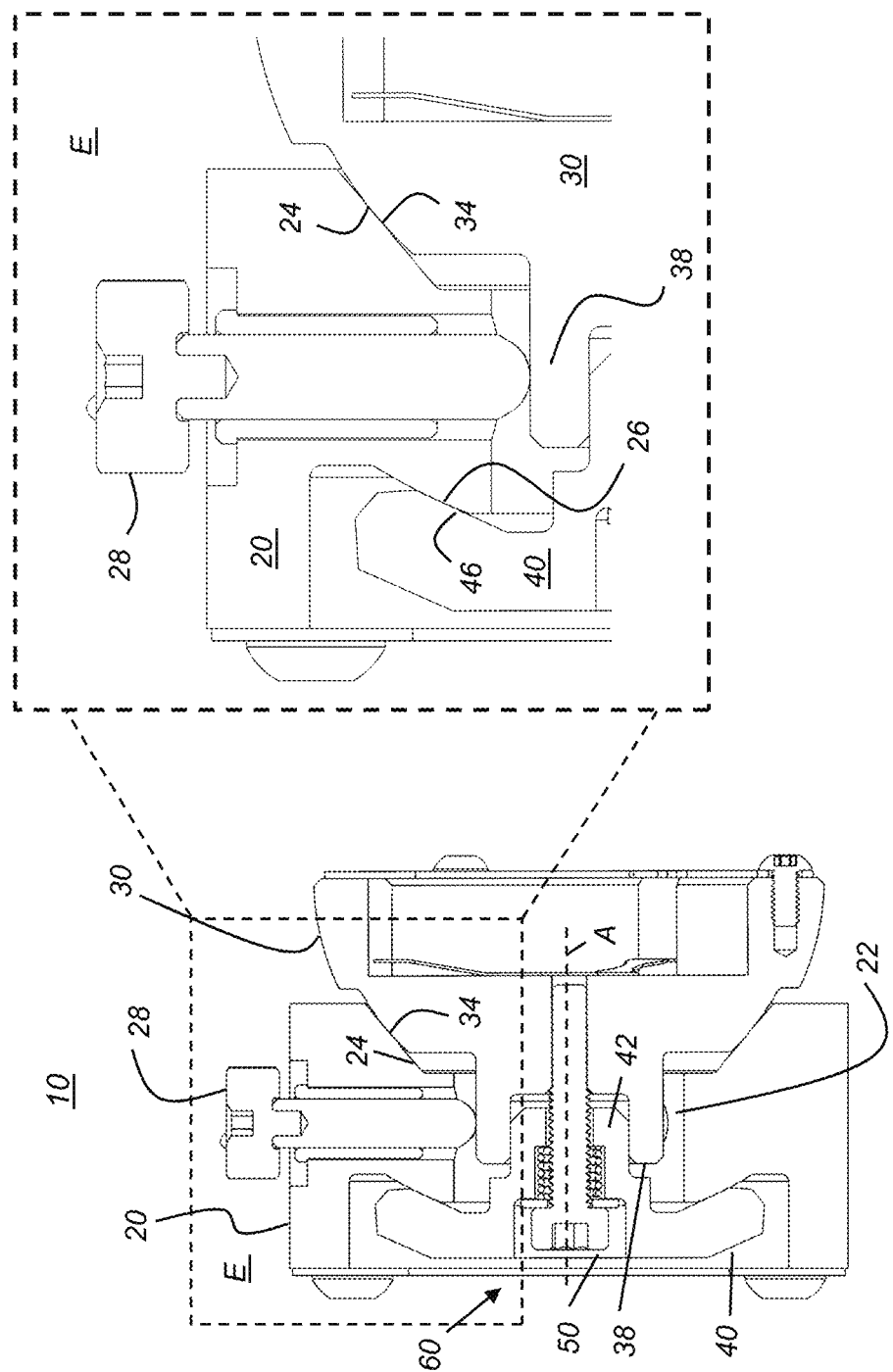
FIG. 2C is a side view showing components used for optical mount alignment and adjustment.

FIGS. 2A and 2B show perspective cross-sectional views of mount 10. FIG. 2C shows mount 10 in cross-sectional side view. Mount 10 is formed with a frame 20 and a pivotable component support 30 that is fitted against a component support interface 24 of frame 20. A channel 22, shown as a circularly cylindrical channel in the FIG. 2A, 2B embodiment and in other embodiments described herein, provides a cavity that extends fully through frame 20 between component support interface 24 and a clamping interface 26 on the opposite side of frame 20. Channel 22 can be formed in a symmetric manner about an axis A, so that axis A is a central axis of a circularly cylindrical channel, for example. Reference coordinate axes are shown in FIG. 2A for x, y, and z axial dimensions, with axis A of channel 22 parallel to the z axis.

Optical mount 10 allows pivoting of an optical component about a point R that lies along axis A, allowing a high measure of symmetry between the optical component, as mounted, and pivoting action of optical mount 10.

Figure 2E:
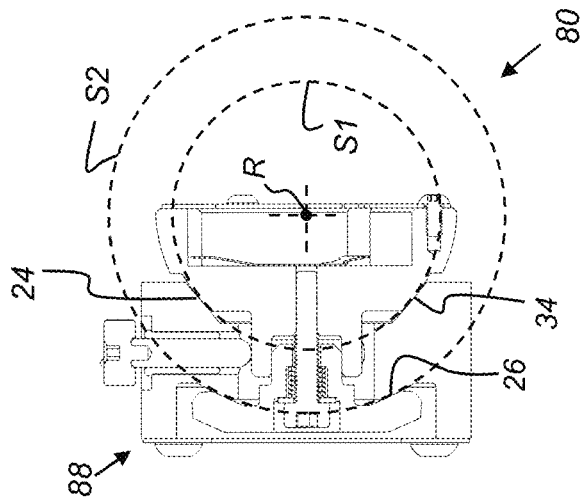
FIG. 2E is a schematic view showing the concentric relationship of spherical surfaces.
Figure 2D:
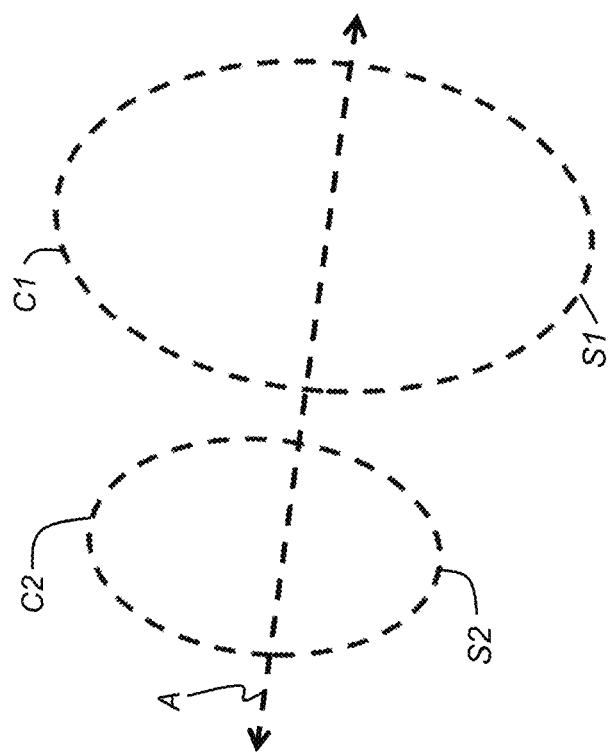
FIG. 2D is a schematic view showing physical constraints and characteristics of the optical mount.

As is shown in the cutaway side view of FIG. 2C, in enlarged portion E at the right, and in subsequent schematic views of FIGS. 2D and 2E, component support interface 24 and clamping interface 26 of frame 20 define curved surfaces, both having spherical curvature; both of these defined curvatures are concentric about point R.

As shown most clearly in FIGS. 2A-2E, frame 20 has a pair of interfaces that, in cooperation with mating component support 30 and clamp member 40, define two curvatures:

(i) a first spherical curvature S1 at the component support interface 24 on a component side 80 of frame 20, wherein spherical curvature is provided by contact along mating curved surface, here between concave component support interface 24 of frame 20 and convex surface 34 of component support 30;

(ii) a second spherical curvature S2 at the clamping interface 26 on a clamp side 88 of frame 20, wherein spherical curvature is provided by contact along mating surfaces, here between convex clamping interface 26 on frame 20 and a concave clamping surface 46 on clamp member 40.

As shown in FIGS. 2A-2E, pivoting of component support 30 is made possible with convex surface 34 configured to seat against the concave surface of component support interface 24 within frame 20. Pivoting of clamp member 40 is possible with concave clamping surface 46 of clamp member 40 configured to seat against the convex surface of clamping interface 26 on frame 20.

In general, spherical curvature can be defined where there is at least one continuous spherical surface that meets another surface that is defined by at least 3 points. Pivoting about the three or more points of contact then defines a center of curvature. According to an embodiment of the present invention, two concentric spherical curvatures, represented in cross section in FIG. 2E, can be formed using frame 20, component support 30, and clamp member 40 and used for positioning an optic or other component.

By "continuous" spherical surface is meant a continuous portion of a spherical cap over which pivoted movement of the corresponding component support 30 or clamp member 40 against frame 20 can be obtained. Pivoting is thus permitted over a continuous range of angles, rather than confined to a limited set of discrete settings.

FIG. 2D shows circles C1 and C2 that represent circular line contacts, symmetric about axis A, that can be defined for the embodiment of FIGS. 2A-2C and 2E. Here, the surface curvatures at contact interfaces between component support 30 and frame 20 on the component side 80 of frame 20 and between clamp member 40 and frame 20 on the clamp side of frame 20 are configured to provide two circular line contacts shown as circles C1 and C2 in dashed lines in FIG. 2D. In this exemplary embodiment, throughout the rotational movement range of component support 30 and associated clamp member 40, contact with frame 20 is maintained along circles C1 and C2, both concentric with respect to axis A and orthogonal to axis A, as shown in FIG. 2D. To achieve this geometric relationship at the circle C1 interface, with contact only along the circle, concave component support interface 24 of frame 20 can be at least slightly conical; the mating convex surface 34 of component support 30 is spherical. Similarly, at the circle C2 interface, convex clamping interface 26 of frame 20 can be spherical; the mating concave surface 46 of member 40 can be conical.

FIG. 2E is a schematic side view showing the concentric relationship of spherical curvatures for clamping interface 26 and component support interface 24 of component support 30 about point R. This concentric arrangement maintains component support 30 and its coupled clamp member 40 in the same position relative to each other along axis A as the combined component support 30/clamp member 40 is pivoted, about point R, as a unit. When a conical/spherical combination of interfacing surfaces is used as described hereinabove, this arrangement maintains the circular contact relationship shown schematically in FIG. 2D over the range of allowable pivot angles.

It should be emphasized that, while combinations using mating spherical and conical surfaces can have practical advantages for fabrication and operability, other combinations for forming a spherical interface are possible and within the scope of the present disclosure. For example, a spherical interface can be formed using a spherical surface and a three-point surface as described in more detail subsequently.

In the embodiment of FIGS. 2A-2C and 2D, a tubular shaft 38 is formed as a portion of component support 30, extending into the channel 22 of frame 20 when component support 30 is seated against frame 20 at component support interface 24.

As is seen in FIG. 2C, a retainer or clamp member 40 can have an extending or protruding portion 42 that fits within tubular shaft 38 and is symmetric about axis A. This fitting can help to align the component support 30 with clamp member 40.

As is further shown in FIGS. 2A-2C, a preloading apparatus 60 can be provided to urge clamp member 40 toward component support 30 in order to align an optical component. As a coupling element, preloading apparatus 60 can have a fastener 50 that extends through the tubular shaft 38 and couples clamp member 40 as a retainer to component support 30. A compression spring 36 then provides a preload force along the direction of axis A and thus in line with rotation point R. The preload force provided by compression spring 36 holds pivotable component support 30 in position, while allowing some adjustment of component support 30 rotation within frame 20 until fastener 50 is tightened. The arrangement shown in FIGS. 2A-2C, with fastener 50 extending as a coupling through frame 20 between component support 30 and clamping member 40, is advantaged because it allows adjustment for securing component position, as described in more detail subsequently. According to an alternate embodiment of the present disclosure, a coupling for urging both clamp member 40 and component support 30 against frame 20 can be provided as a clamping device, bracket, or pair of brackets, for example.

The amount of preload force needed can be based on the relative tightness of fastener 50 with supporting clamping action from compression spring 36. When loosely clamped, initial coarse adjustments to component support 30 positioning can be made in order to align the corresponding mirror or other optical component as desired. One or more adjustment members 28 can then be used to apply an urging force against tubular shaft 38 for fine tuning adjustment and to fix the angular position achieved. When the proper component orientation is achieved, fastener 50 can then be fully tightened, effectively compressing frame 20 between component support 30 and clamping member 40. Adjustment members 28 can remain in place to hold the pivot angle at a fixed position or, after the final tightening of fastener 50 that locks component support 30 in position, can alternately be removed.

Compression spring 36 is one type of component that can be used to provide a preloading force as part of preloading apparatus 60. It should be noted that other types of preloading force could be provided to clamp member 40 by alternative components, such as using a magnet or other device.

Figure 2F:
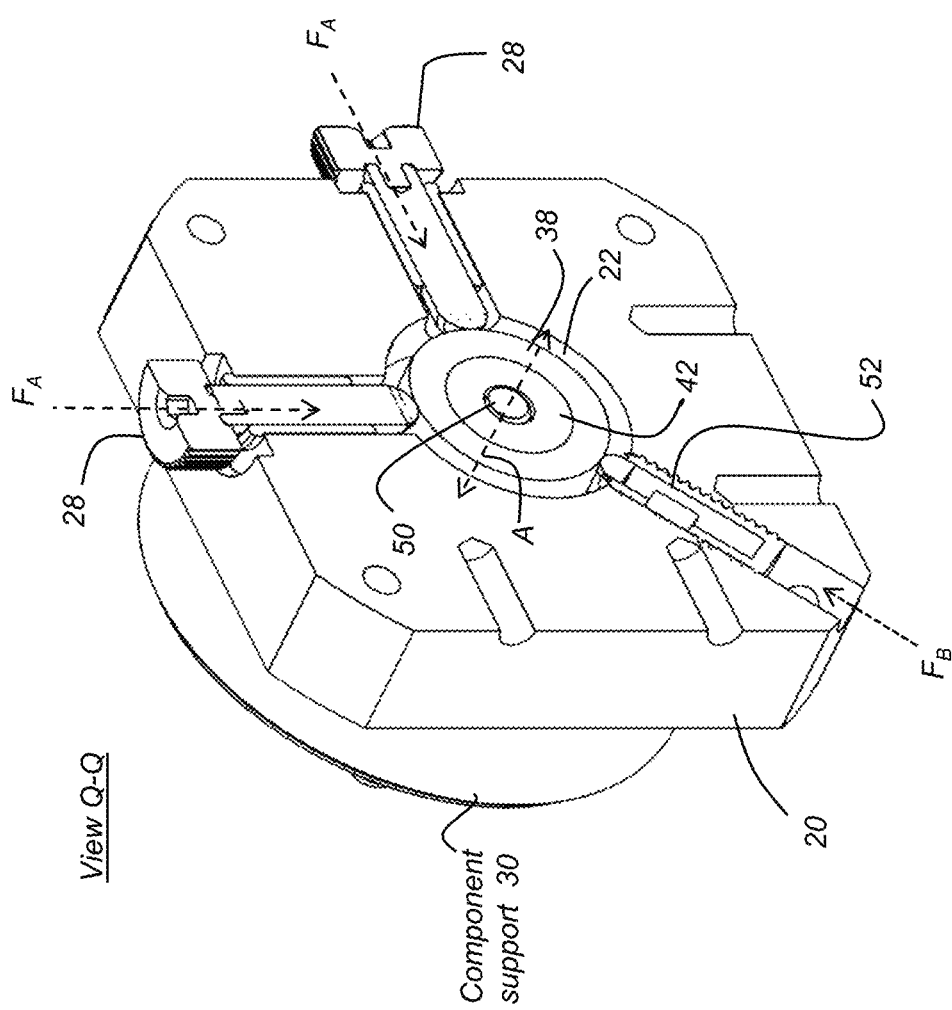
FIG. 2F is a cross-sectional cutaway view in perspective of the optical mount frame.
Figure 2G:
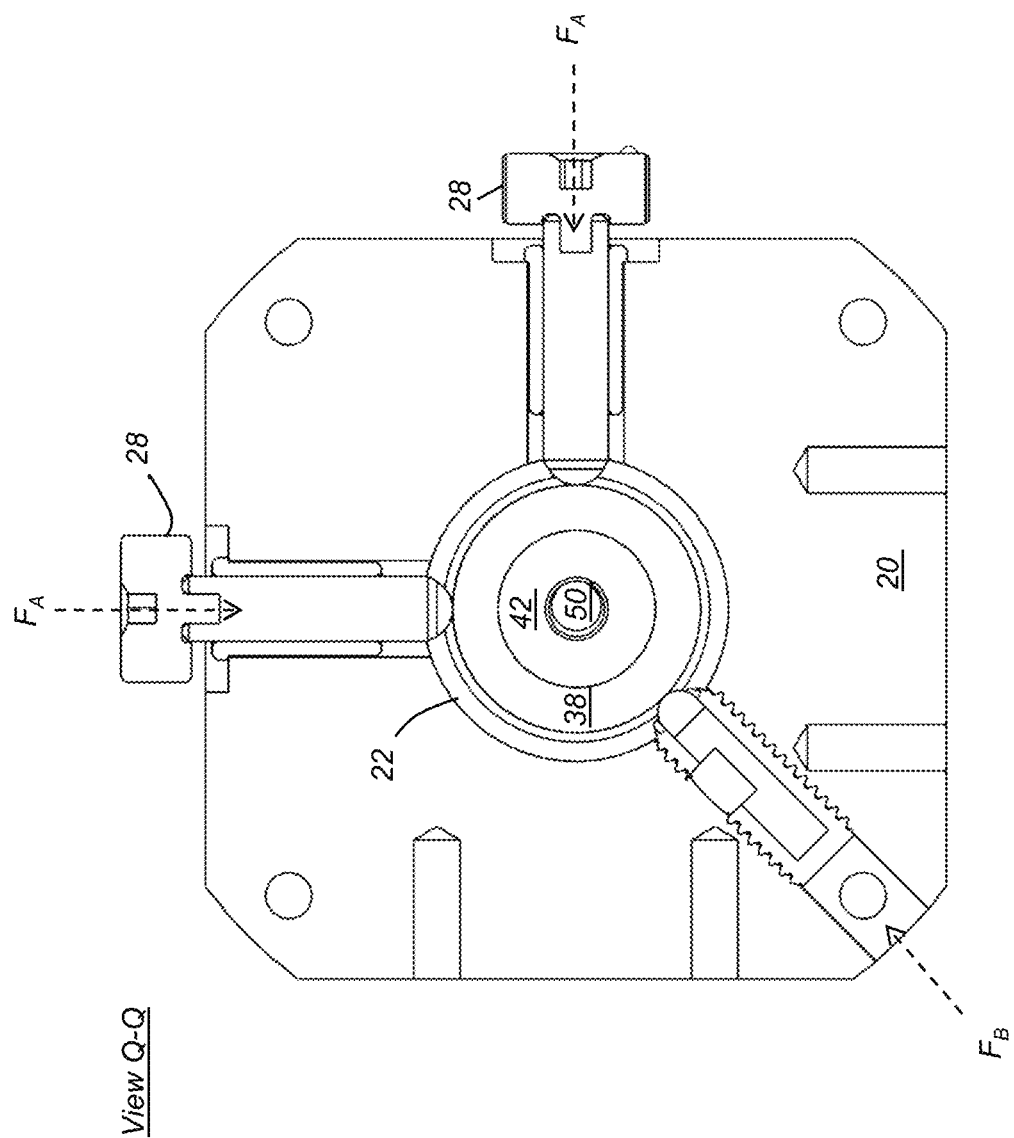
FIG. 2G is a cross-sectional cutaway view of the optical mount frame

The cross-sectional cutaway views of FIGS. 2F and 2G show the relative positions of adjustment and biasing elements of optical mount 10 and the orientation of forces and constraints applied by these elements. While under the preload force along axis A, clamp member 40 retains component support 30 in a stable position that is suitable for fine-tuning adjustment. Adjustment members 28, typically threaded screws or similar devices, can apply adjustment force $F_A$ against tubular shaft 38 in order to urge component support 30 incrementally to its proper angle. Applied forces $F_A$ are orthogonal to axis A. A biasing force $F_B$, also orthogonal to axis A, can be applied using an adjustable biasing member 52, such as a spring plunger or similar biasing device. One exemplary spring plunger that can be used as adjustable biasing member 52 for optical mount 10 is an 18-8 Stainless Steel Slotted Long-Nose Spring Plunger from McMaster-Carr Supply Co., Aurora, Ohio FIG. 2G also shows the concentric fitting of fastener 50 within extending portion 42 of clamp member 40 and tubular shaft 38 of component support 30.

The arrangements shown in FIGS. 1-2G are well suited for mounting a reflective component such as a flat or curved mirror. A number of fasteners 14 (FIG. 1) can be provided for component coupling, mounting and positioning the optical component or other type of component supported by optical mount 10.

Figure 3A:
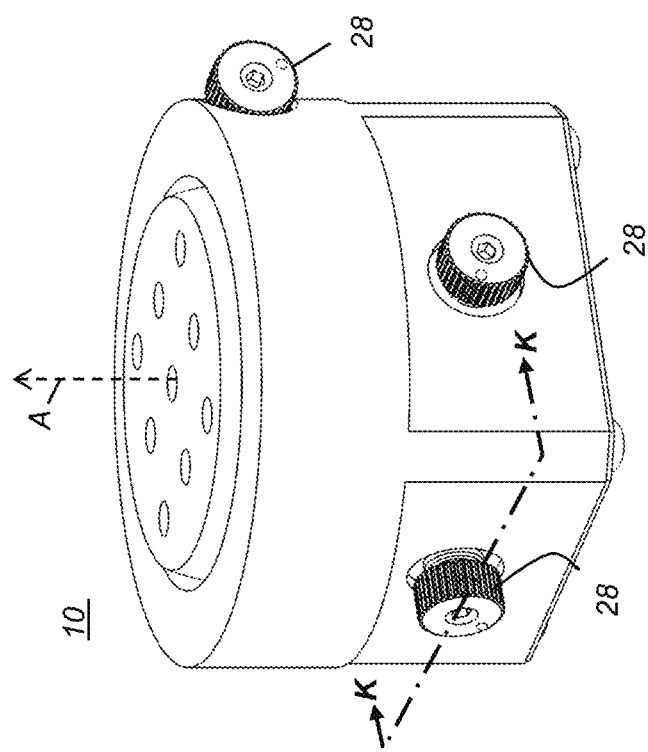
FIG. 3A is a perspective view of the optical mount according to an alternate embodiment.
Figure 3B:
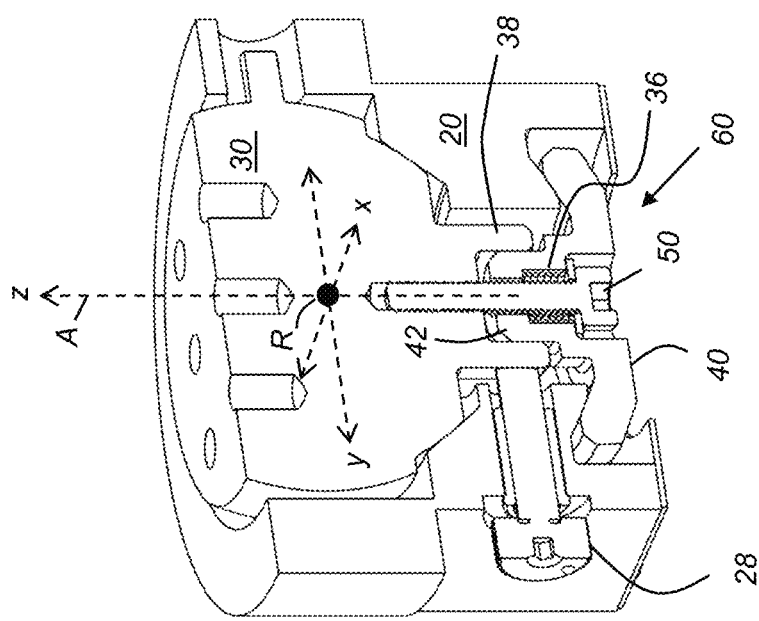
FIG. 3B is a cutaway perspective view of the optical mount of FIG. 3A.

By way of further example, FIGS. 3A and 3B show an alternate arrangement of mount 10, shown with axis A in a vertical orientation. The same arrangement of curved surfaces on each side of channel 22 and use of preload force along axis A apply. Mutually orthogonal x, y, and z axes are shown for reference, with axis z aligned with axis A. Relative to these axes, the three adjustment members 28 shown allow rotation about each respective axis. One of the adjustment members 28 is shown in the cross section of FIG. 3B. The FIGS. 3A and 3B configuration can be used to support a flat component or some other type of component mounting. For example, rotation about the z axis (A axis) can be useful for aligning a beam splitter cube. Pivoting of component support 30, and corresponding rotation of the respective axes with axis z aligned with axis A, is again about point R. Point R can be located within mount 10 or outside mount 10 along axis A.

FIG. 3C shows a cutaway slice of the FIG. 3A mount, showing relative positions of adjustment members 28 and adjustable biasing member 52 for this embodiment.

Figure 4A:
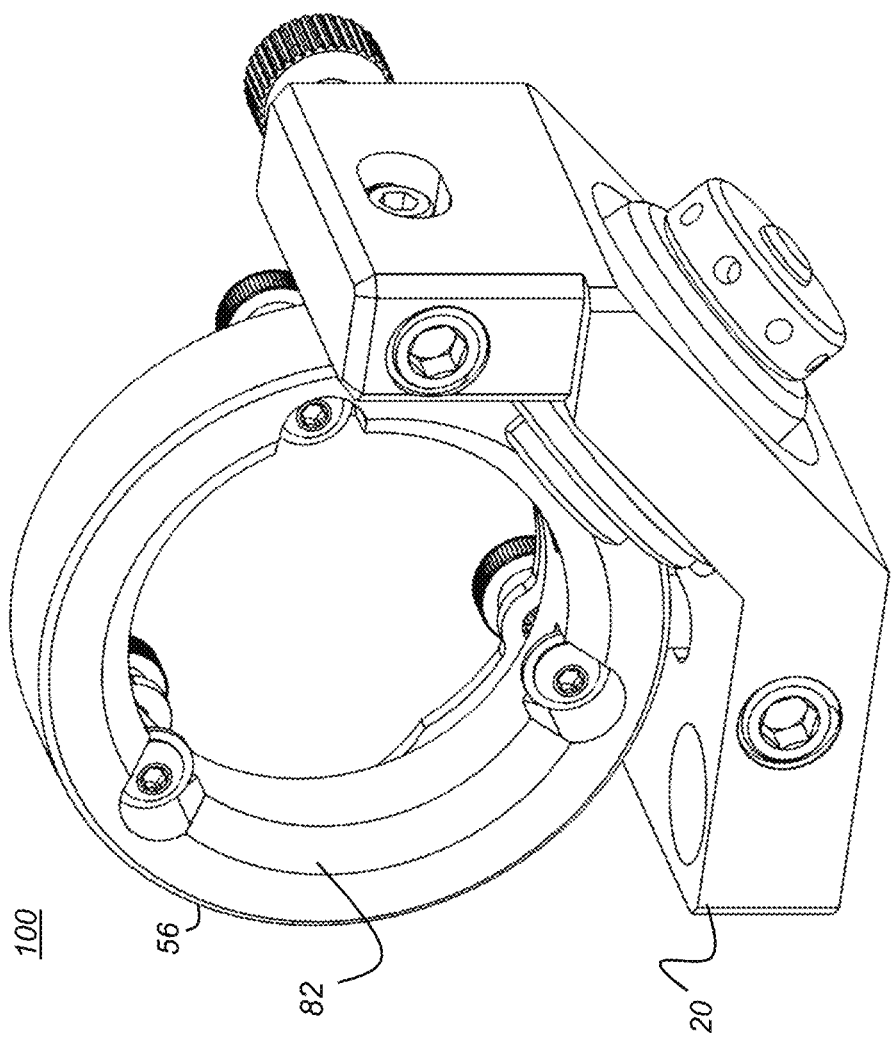
FIG. 4A is a perspective view of the optical mount according to another alternate embodiment.
Figure 4B:
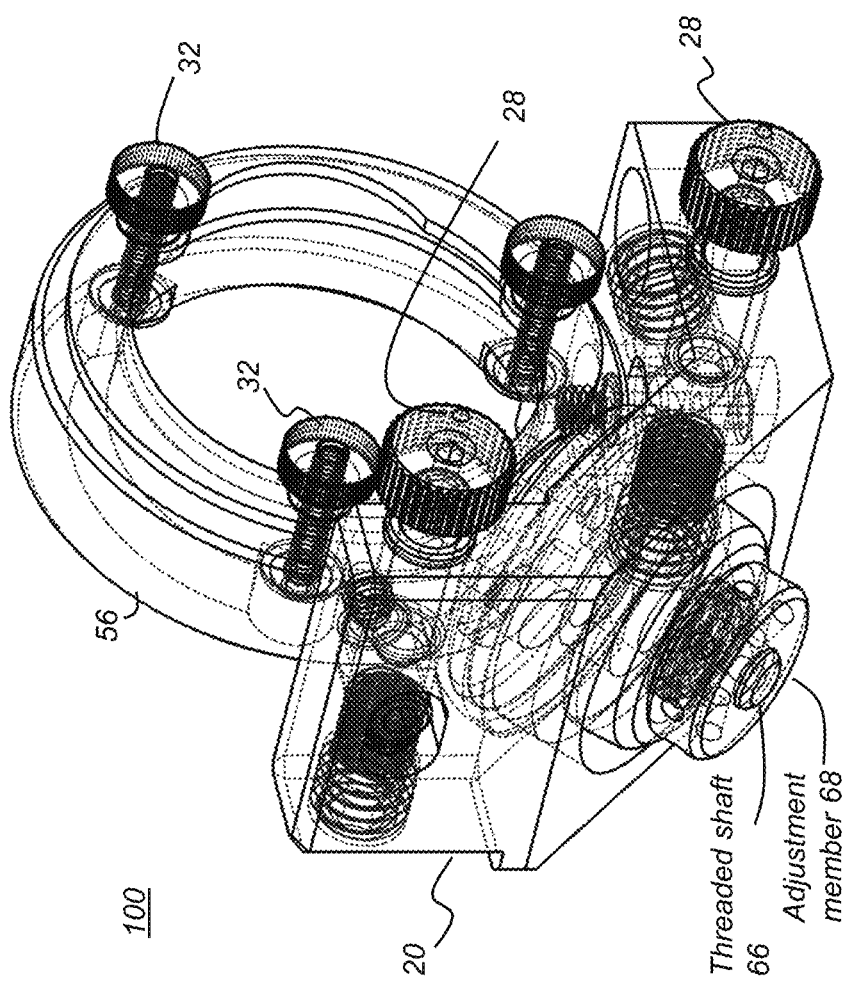
FIG. 4B is a perspective view showing the position of external adjustment members for the FIG. 4A embodiment.
Figure 4C:
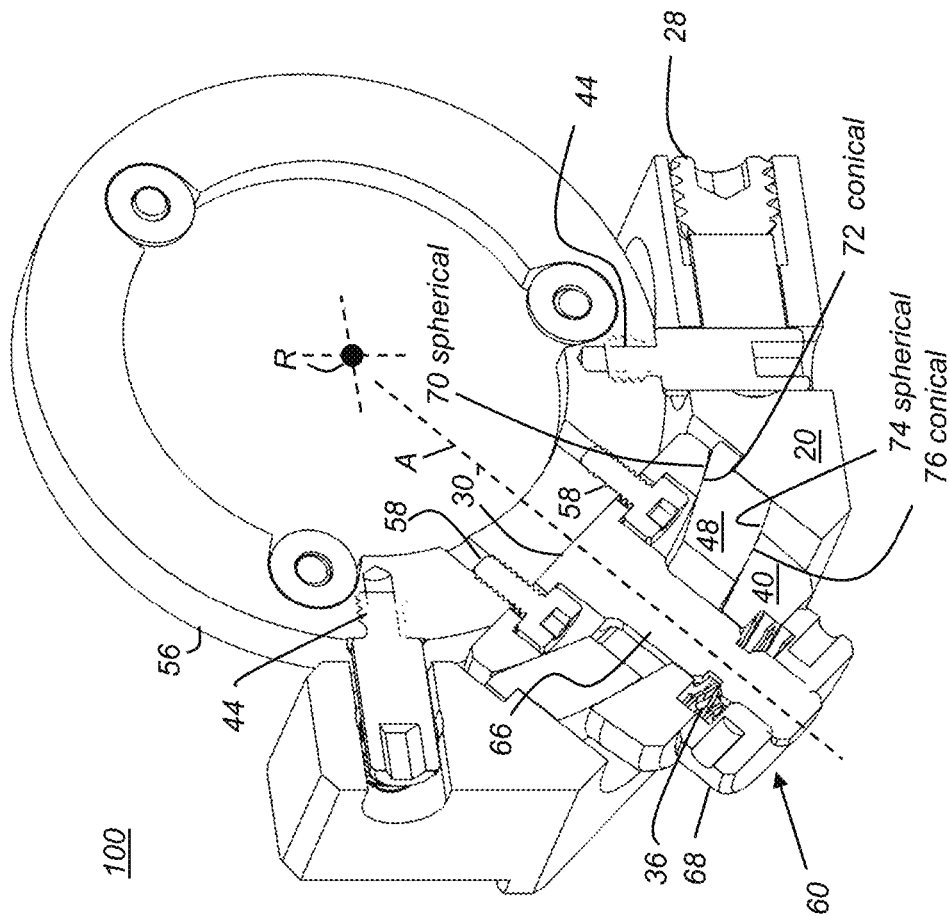
FIG. 4C is a cutaway perspective view of the optical mount of FIG. 4A.
Figure 4D:
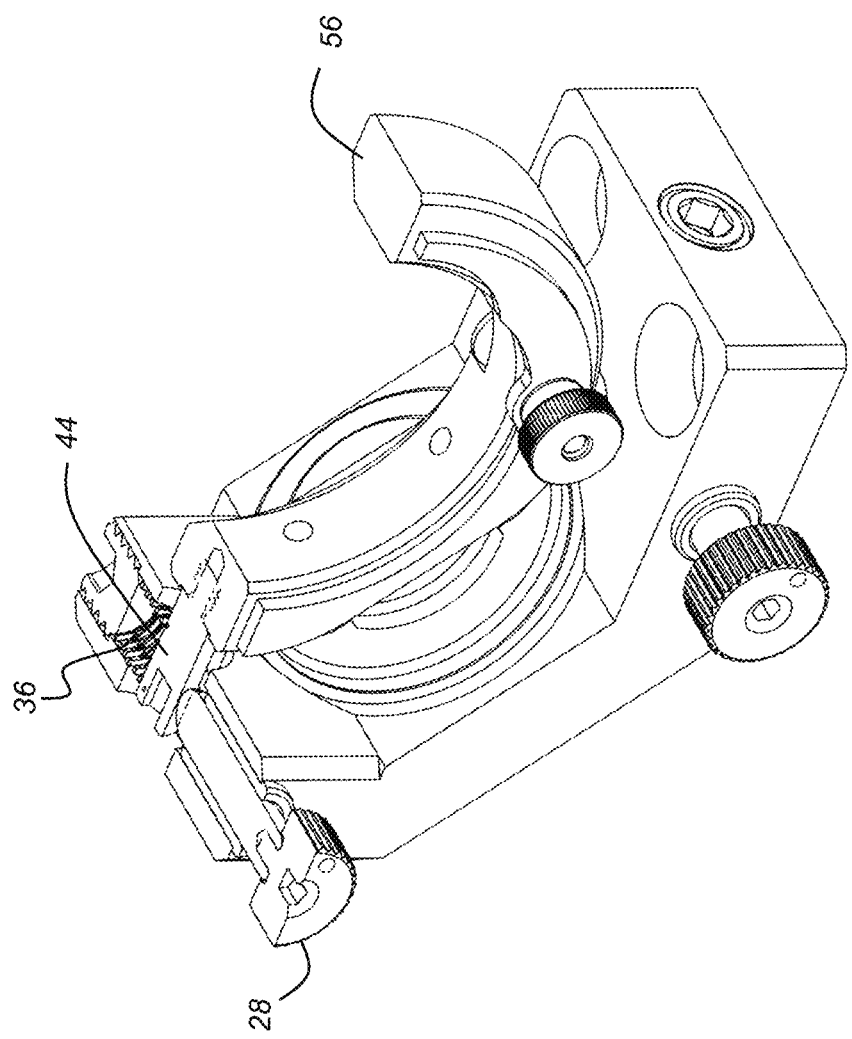
FIGS. 4D and 4E show alternate cutaway perspective views of the optical mount of FIG. 4A.
Figure 4E:
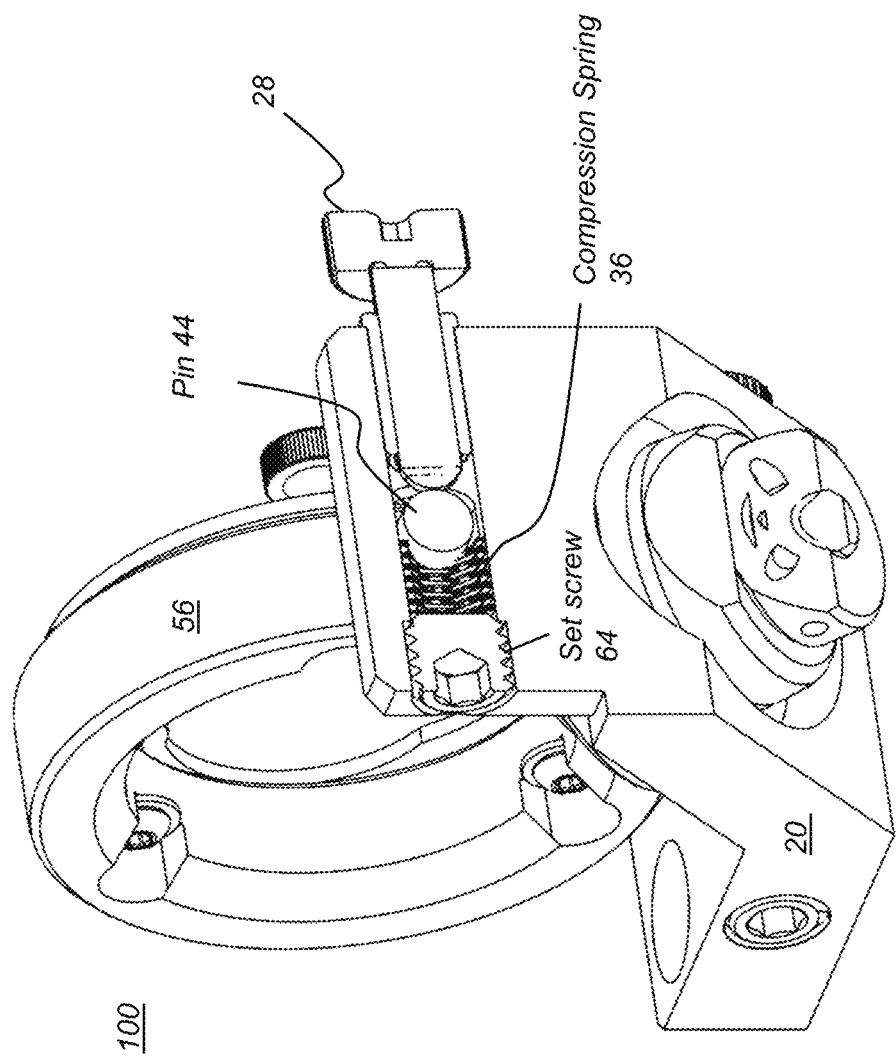

The perspective view of FIG. 4A, hidden line view of FIG. 4B, and cutaway perspective views of FIGS. 4C, 4D, and 4E show another alternate embodiment of an optical mount 100, particularly well suited to mounting a transmissive optical component, such as a lens, polarizer, or filter, for example. Axis A extends in parallel with the mounting plane arrangement for a mounted optical component, wherein a surface of the optical component lies along or is extended with respect to a mounting plane, and wherein the mounting plane is defined by a mounting apparatus 56 that is coupled to component support 30. The mounting plane for a flat component can be defined by a surface of mounting apparatus 56, such as a surface that is orthogonal to incident light for example. FIG. 4A shows one exemplary component mounting surface 82. formed as an inner shelf or ring within mounting apparatus 56. Axis A is aligned with point R. As in preceding embodiments, point R serves as the center of rotation for pivoting of mounting apparatus 56 and center of curvature for spherical surfaces of the positioning mechanism.

Referring to FIG. 4B, the position of external adjustment members 28 is shown, along with hidden lines indicative of positioning for compression springs and pins that are used for supporting the adjustment process. A nut provides a fastening mechanism as an adjustment member 68 for holding component mounting apparatus 56 in position, as described in more detail with reference to subsequent figures. A number of fasteners 32 can be provided for mounting the optical component or other type of component supported by optical mount 100.

Referring to the cross-section view of FIG. 4C, the position, geometry, and function of mount 100 components is shown in more detail. Component support 30 can be coupled to component mounting apparatus 56 by threaded fasteners 58 or other coupling mechanism. Component support 30 has a shaft 66 that is threaded at the end for connection with a nut or other adjustment member 68. This mechanical connection, with adjustment member 68 threaded to the shaft, applies the force of compression spring 36, a force applied in the direction of axis A, for urging component support 30 toward clamp member 40. A collar 48 is formed or fixed within frame 20, thus serving as an integral part of frame 20, and cooperates with component support 30 to provide spherical/conical and conical/spherical interfaces, with circular line contact as previously described with reference to FIG. 2D. Alternate combinations could be used to define a spherical interface, as also noted previously. In the configuration of FIG. 4C, component support 30 has a convex spherical surface 70 that is fitted against concave conical surface 72 of collar 48. Clamp member 40 has a concave conical surface 76 that seats against a convex spherical surface 74 of collar 48.

The partial cutaway views of FIGS. 4D and 4E show one of the adjustment mechanisms for mounting apparatus 56 of mount 100. For adjustment, dowel or tooling pins 44 can be coupled to component mounting apparatus 56. Adjustment members 28 then apply a motive force against corresponding pins 44 and against the bias force of corresponding compression springs 36, which can be held in position using set screws 64. As in the embodiments shown earlier, the actuator screw of each adjustment members 28 provides a motive force about an axis orthogonal to axis A. The combined set of adjustment members 28 for the optical mount 100 apply mutually orthogonal forces for mount positioning.

Figure 5B:
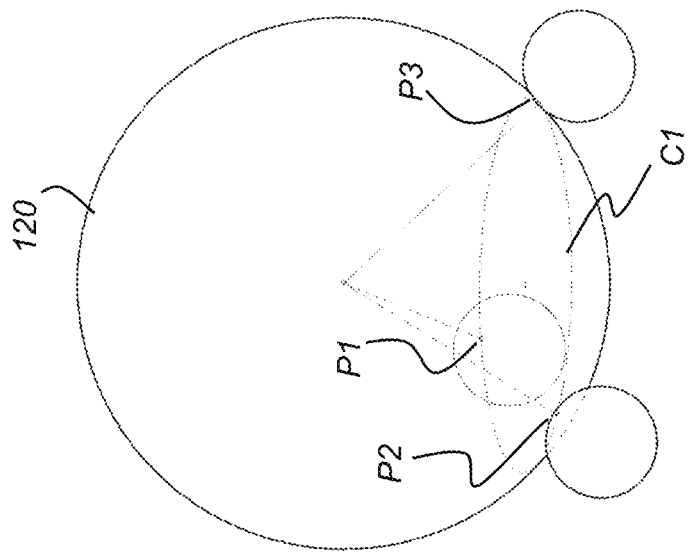
FIGS. 5A and 5B show principles of geometry for defining a spherical interface between a continuous spherical surface and a mating structure.
Figure 5A:
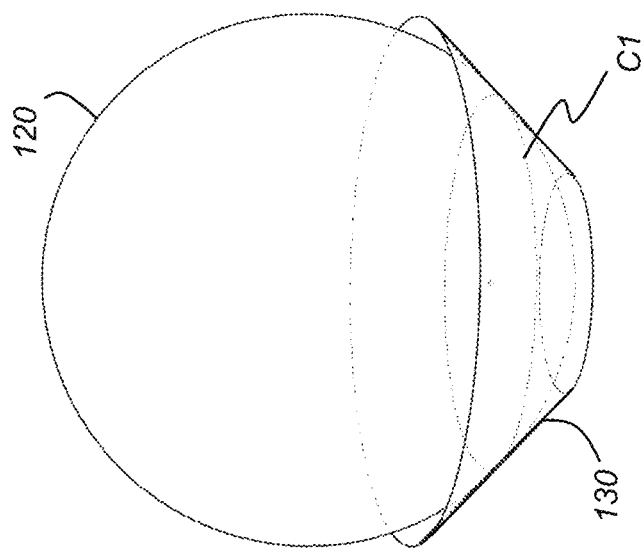

As noted previously, pivoting movement of component support 30 and clamp member 40 follows a spherical curvature that is defined at the interface between a continuous spherical surface and at least three points that define a second surface. FIGS. 5A and 5B show principles of geometry for defining a spherical interface between a continuous spherical surface and a mating structure. In FIG. 5A, the surface of a sphere 120 is seated within a conical cavity 130. Contact between the continuous surface of sphere 120 and the continuous surface of conical cavity 130 lies along line C1, as was described previously with respect to FIG. 2D, for example. The same line C1 is defined for any pivoted position of the sphere 120 surface.

FIG. 5B shows an interface that seats a spherical surface having the diameter of sphere 120 with three contact points P1, P2, P3 that can be visualized as lying on circle C1 or in the same plane as circle C1. The same three contact points P1, P2, P3 apply for any pivoted position of the sphere 120 surface. For the purpose of defining a spherical interface and allowing pivoting movement of a spherical surface at that interface, it can be readily seen that the geometric arrangements of FIGS. 5A and 5B apply similar principles. It should also be noted that the three fixed contact points of FIG. 5B can alternately be provided using three planar surfaces, each tangential to the surface of sphere 120, for example.

Figure 6:
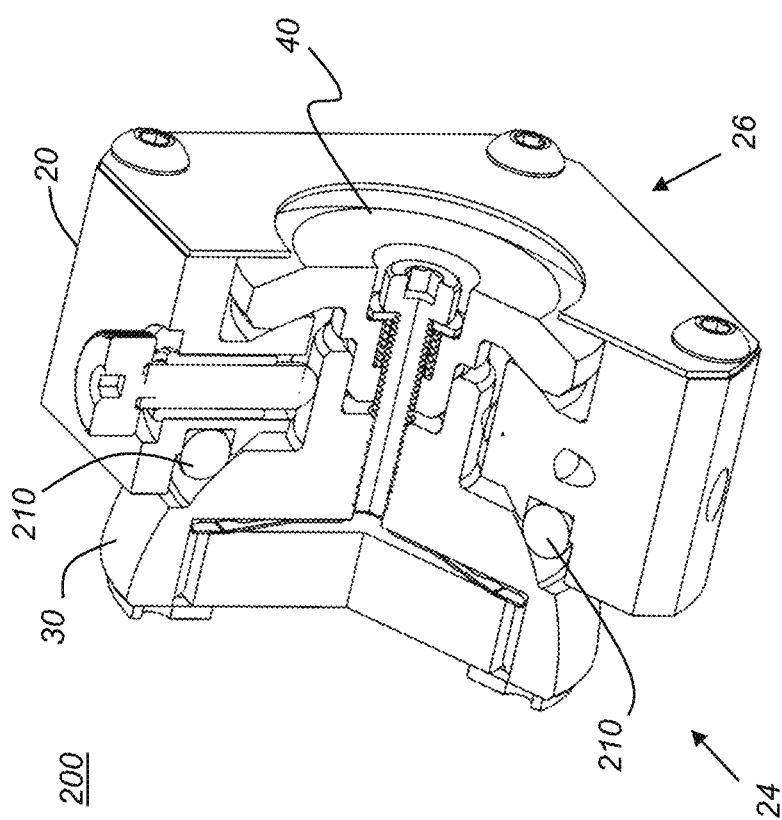
FIG. 6 is a perspective cutaway view that shows an alternate embodiment using three-point contact at the component support interface.

FIG. 6 is a perspective cutaway view that shows an alternate embodiment using three-point contact at the component support interface. A set of three spheres 210, two of which are shown in FIG. 6, are fitted into frame 20 to form point-contacts of component support interface 24 for pivotably seating component support 30. It should be noted that a similar three-point contact arrangement could be used for pivotably seating clamp member 40 at clamping interface 26.

Materials used for fabrication of optical mounts 10, 100, 200 described herein can include any suitable materials such as metals, ceramics, and various polymers that can be suitably machined, molded, or otherwise formed with sufficient precision to be useful for mounting and alignment of optical components.

According to an embodiment of the present disclosure, an optical mount has a frame with (i) a circular channel symmetric about an axis that extends through the frame; (ii) a concave surface at one end of the circular channel on a component side of the frame; and (iii) a convex surface at the opposite end of the circular channel along a clamp side of the frame. There is a pivotable holder for holding an optical component the holder having a convex surface that is featured to seat within the concave surface of the frame, and having a tubular shaft formed to extend into the channel of the frame when the convex surface is seated. A clamp member is configured with an extending portion that fits within the tubular shaft of the holder. A fastener extends through the tubular shaft and couples the clamp member to the pivotable holder within the circular channel. The clamp member seats a concave clamping surface against the convex surface of the frame. There can be comprising one or more adjustment members configured to apply an urging force against the tubular shaft and in a direction orthogonal to the axis. The concave surface of the frame can be conical. The convex surface of the frame can be spherical. The convex surface of the holder can be spherical. Both the convex surface of the frame and the convex surface of the holder can be spherical and have a common center of rotation.

The present disclosure has made particular reference to a presently preferred embodiment, but it can be understood that variations and modifications can be effected within the spirit and scope of the invention. The presently disclosed embodiments are therefore considered in all respects to be illustrative and not restrictive. The invention is defined in the following claims.

What is claimed is:

1. An optical mount comprising:
 a) a component support for an optical component;
 b) a clamp member;

c) a frame having:
  (i) a component support interface that, when positioned against the component support, defines a first spherical curvature for pivoting the component support about a center of curvature,
    wherein the component support has a continuous spherical surface having the first spherical curvature;
  (ii) a clamping interface that defines a second spherical curvature, concentric with the center of curvature of the component support interface, for pivoting the clamp member;
  and
d) a coupling that is configured to urge the clamp member and the component support against the frame.

2. The optical mount of claim 1 wherein the optical component is formed on the component support.

3. The optical mount of claim 1 wherein the clamp member has a spherical surface having the second spherical curvature.

4. The optical mount of claim 1 wherein the coupling is an integral part of the clamp member.

5. The optical mount of claim 1 wherein one or more of the component support interface and the clamping interface provide contact of a spherical surface against three point-contacts.

6. The optical mount of claim 1 wherein the frame has a channel and wherein the channel has an axis that extends between the component support interface and the clamping interface.

7. The optical mount of claim 6 further comprising one or more adjustment members configured to apply an urging force in a direction orthogonal to the axis for fixing component position.

8. The mount of claim 6 wherein the axis of the channel extends in parallel with a mounting surface that is defined by the component support.

9. An optical mount comprising:
a) a frame having a first concave surface and a second convex surface opposite the first concave surface and having a channel extending through the frame between the first and second surfaces;
b) a pivotable component support for an optical component, the component support having a convex base surface and having a tubular shaft formed to extend into the channel of the frame when the convex base surface is seated against the first concave surface of the frame; and
c) a clamping member that is configured with an extending portion that fits within the tubular shaft of the pivotable component support, wherein the clamping member has a concave clamping surface that is featured for coupling against the second convex surface of the frame.

10. The optical mount of claim 9 further comprising a fastener that extends through the tubular shaft and couples the clamping member to the pivotable component support within the channel.

11. The optical mount of claim 9 wherein the first concave surface of the frame is conical.

12. The optical mount of claim 9 wherein the first concave surface of the frame is spherical.

13. The optical mount of claim 9 wherein the first concave surface of the frame provides a three-point contact that is configured to seat the pivotable component support.

14. The optical mount of claim 9 wherein the channel is circularly cylindrical and symmetric about an axis and wherein the axis is parallel to a surface of the optical component when mounted in the component support.

15. The optical mount of claim 9 wherein the optical component is formed on the component support.

16. The optical mount of claim 9 further comprising a fastener extending through the channel and disposed to urge the component support towards the clamping member.

17. A method for mounting an optical component, the method comprising:
providing a frame having:
  (i) a component support interface that defines a first spherical curvature for pivoting a component support about a center of curvature,
    wherein the component support has a continuous spherical surface having the first spherical curvature;
  (ii) a clamping interface that defines a second spherical curvature, concentric with the first spherical curvature, for pivoting a clamp member;
  (iii) a channel along an axis extending between the component support interface and the clamping interface;
pivoting the component support to a rotational position for the optical component;
urging the component support toward the clamp member by tightening a coupling that extends through the channel; and
fixing an angular position of the component support by an adjustment that directs a force that is orthogonal to the axis.

18. The method of claim 17 wherein tightening the coupling comprises adjusting a compression spring.

* * * * *